March 6, 1962  J. C. SINEX  3,023,414
CAPTIVE PISTON STUD DRIVER
Filed Feb. 26, 1958  4 Sheets-Sheet 1

INVENTOR.
JOHN CLARKE SINEX
BY John H. Lewis Jr.
Harry E. Braddock
ATTORNEY

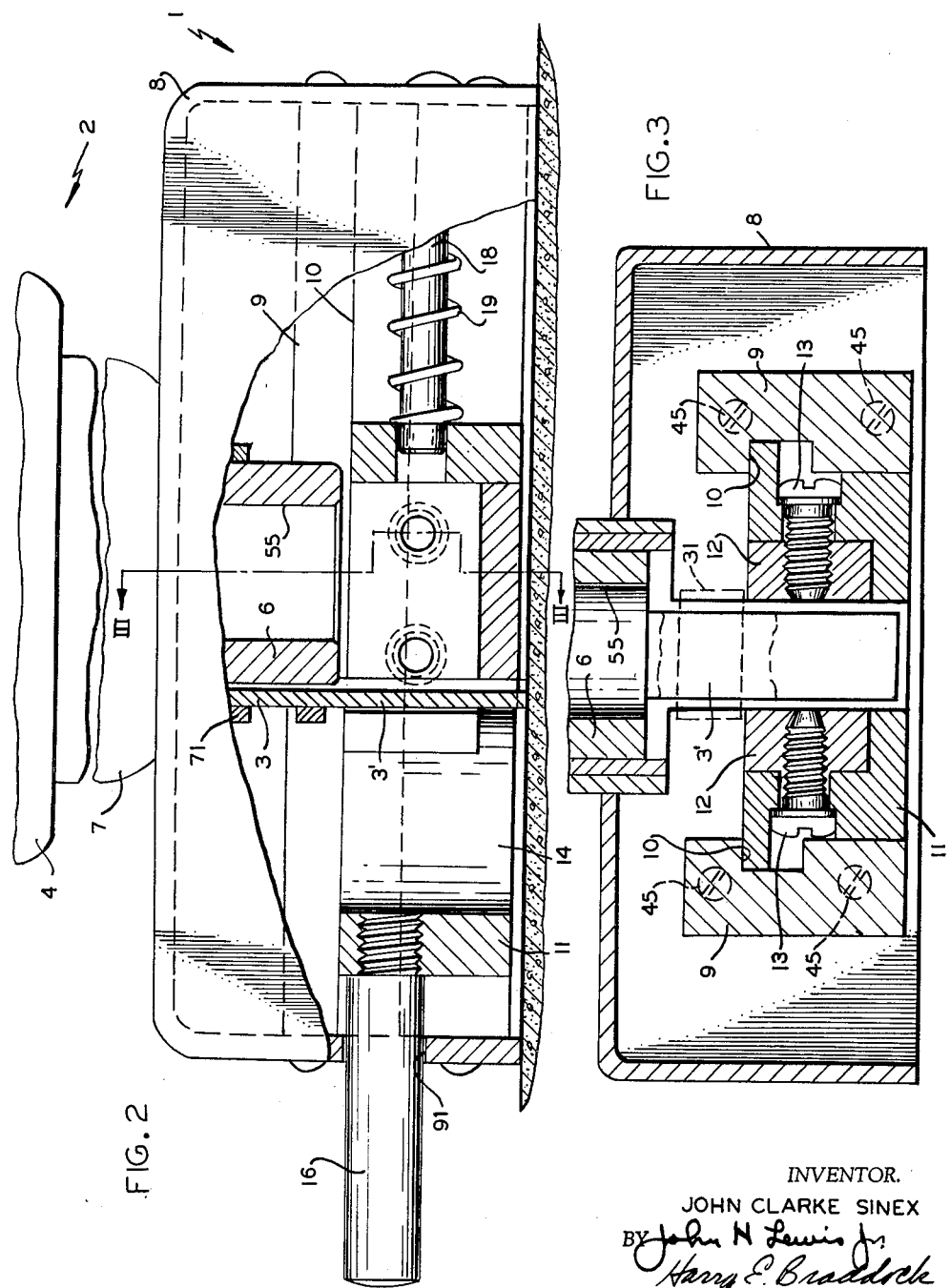

March 6, 1962 J. C. SINEX 3,023,414
CAPTIVE PISTON STUD DRIVER
Filed Feb. 26, 1958 4 Sheets-Sheet 3

INVENTOR.
JOHN CLARKE SINEX
BY
ATTORNEY

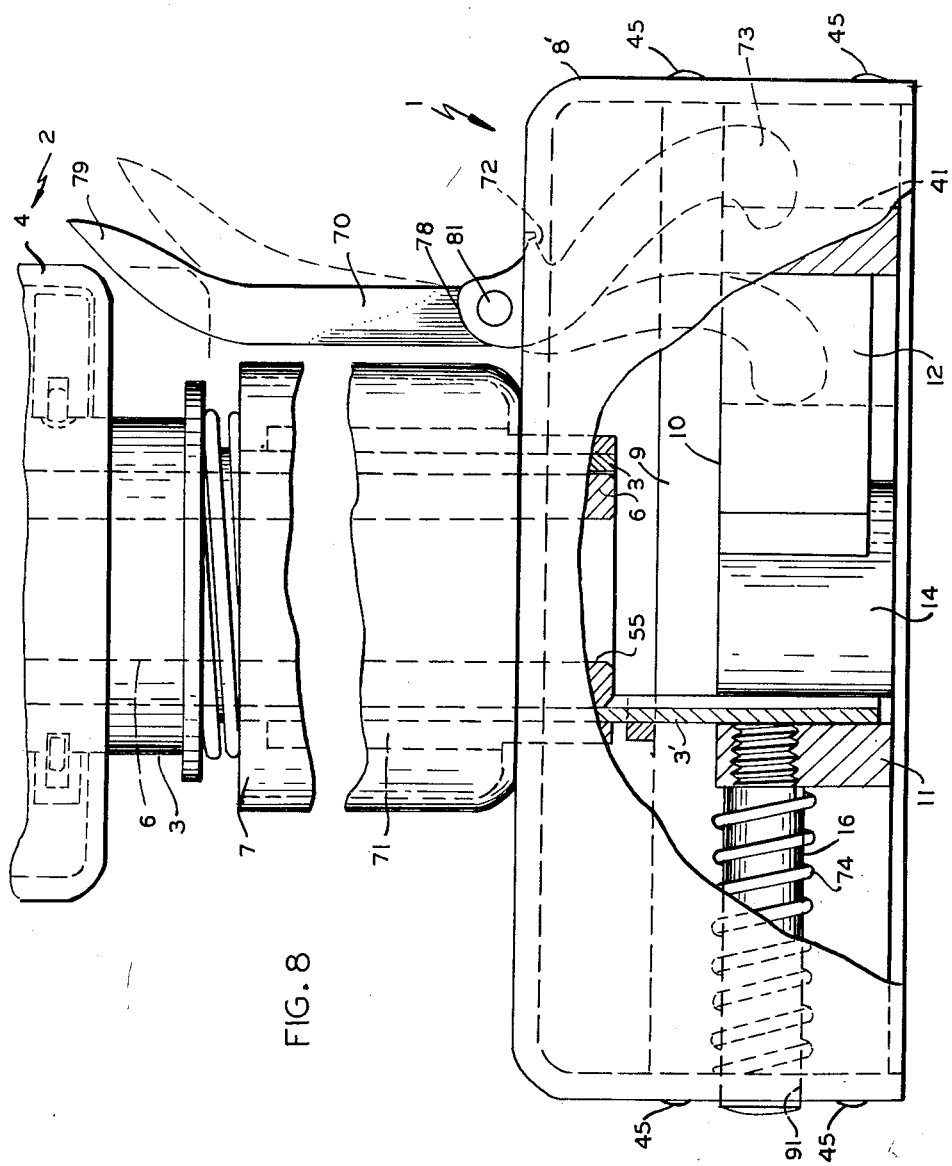

United States Patent Office 3,023,414
Patented Mar. 6, 1962

3,023,414
CAPTIVE PISTON STUD DRIVER
John Clarke Sinex, Ilion, N.Y., assignor to Remington Arms Company, Inc., Bridgeport, Conn., a corporation of Delaware
Filed Feb. 26, 1958, Ser. No. 717,607
7 Claims. (Cl. 1—44.5)

This invention relates to the field of powder actuated tools, known in the art as stud drivers, which are used to project fastener pins through a barrel member into steel, concrete, or wood, for fastening purposes by means of the explosive forces of a propellant cartridge.

More specifically, this invention relates to an improvement in a particular type of such tool or stud driver in which the forces of the explosion act directly upon a piston which slidably fits into the barrel and is secured to the fastener pin which receives its driving force indirectly from the explosive cartridge via the piston member. Abutment means are used in connection with the tool to limit the travel of the piston and connected fastener pin with respect to the muzzle end of the barrel. This feature is provided to prevent free flight of the fastener pin and/or the piston in the event that insufficient work piece resistance is encountered to independently stop the stud and piston. This is commonly referred to as a "no load shot." An example of a tool of this type is disclosed in the patent application Serial No. 574,677, to Robert T. Catlin and John C. Sinex, filed March 29, 1956.

It is one object of this invention to provide a safety attachment for a conventional stud driver tool which will prevent the free flight of the projected piston fastener device or of the fastener device and piston element in those tools utilizing a piston element.

It is another object of this invention to provide a captive piston and captive stud tool which is not only safe and reliable but which is also greatly improved as to speed and ease of operation.

Another object is the provision of a captive piston tool which is simplified in construction which results in economy of manufacture, facilitated maintenance and repair procedures.

A further object is a greatly simplified arrangement of parts which permits a simpler and speedier procedure to be followed in the event of a "no load shot" which causes the safety abutment feature to function.

Other objects will appear from a consideration of the following specification and with reference to the accompanying drawings in which:

FIGURE 1 is a side elevation of the lower portion of a powder actuated tool embodying the features of the preferred embodiment of the invention. Part of the guard element and certain other elements are broken away and shown in section to clarify the arrangement and cooperation of parts which are shown in a position wherein the movable safety abutment assembly is in position to permit withdrawal of the piston from the muzzle end of the barrel.

FIGURE 2 is also a side elevation of the lower portion of the powder actuated tool shown in FIGURE 1, with parts broken away to show the movable safety abutment assembly in position to prevent departure of the piston from the muzzle end of the barrel. The parts are shown in the position they would occupy with the tool in engagement with a work surface W and with the housing thereof advanced toward that work surface a sufficient amount to condition the tool for firing.

FIGURE 3 is a sectional view taken of the lower portion of the tool shown in FIGURE 2 taken on line III—III of FIGURE 2.

FIGURE 8 is a side elevation of the lower portion of a powder actuated tool embodying an alternative form of the invention. Part of the guard element and certain other elements are broken away and others shown in section to show more clearly the arrangement and cooperation of the component parts.

Figure 1:
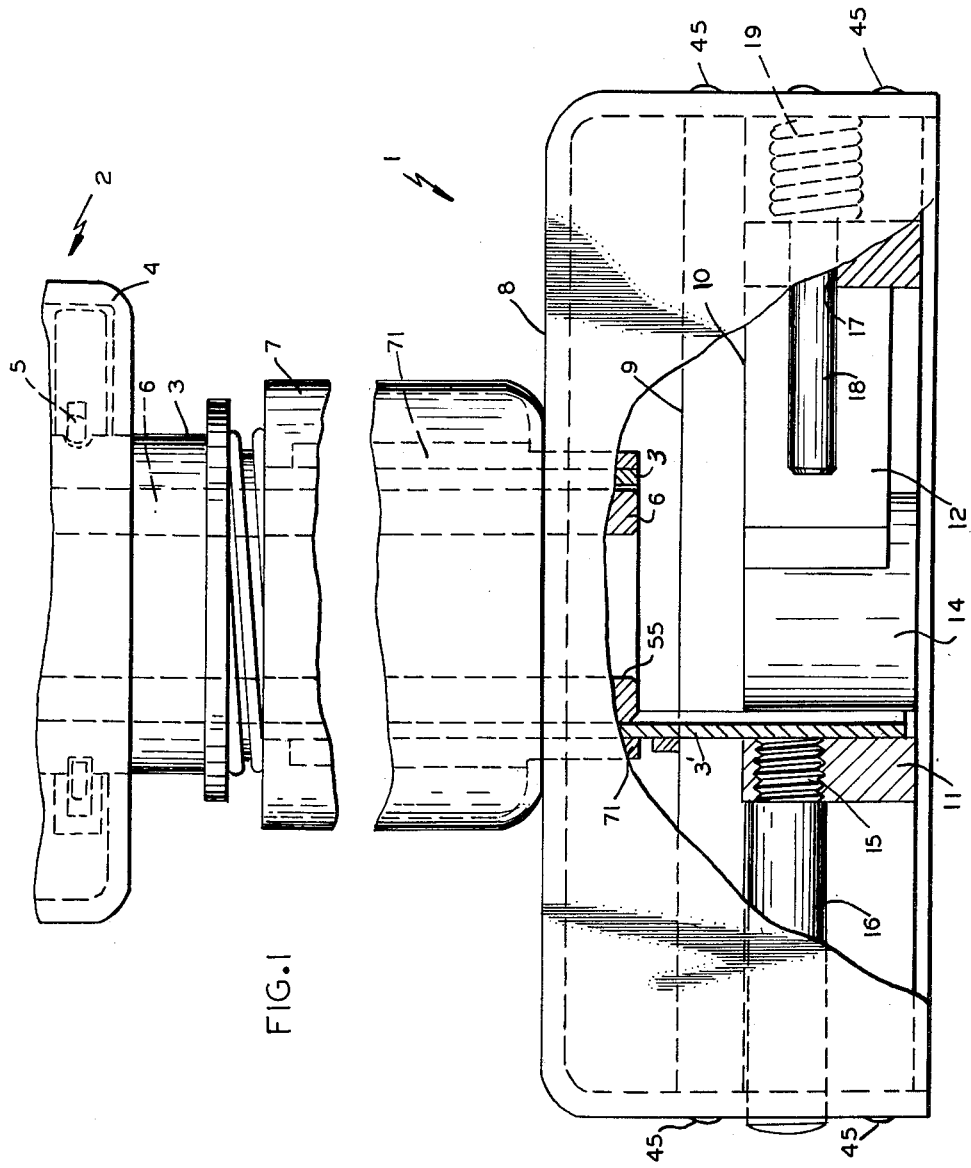

Referring to the drawings the safety attachment indicated generally as 1 is shown cooperating with an explosive operated tool indicated generally as 2. In FIGURES 1 and 8 we have illustrated by elements 4, 5, and 6, parts of known stud driver tools such as that disclosed in the co-pending patent application of Merle H. Walker, Newton M. Reed, and Robert T. Catlin, Serial No. 517,192, filed June 22, 1955 and entitled "Powder Actuated Tool."

Briefly and generally, element 4 is part of the stud driver housing which contains the operating and breech mechanism (not shown) of the tool and in which housing the barrel 6 is secured. As can be seen in FIGURE 1 the safety attachment 1 is comprised among other elements, of a guide tube 3 which slidably receives the barrel 6. Guide tube 3 is connected to the stud driver tool by resilient snap ring 5 and annular grooves in both the guide tube 3 and adjacent resiliently mounted internal stud driver structure in a manner fully disclosed in the aforementioned application Serial Number 517,192, and which is not important to the invention of the present application.

In FIGURE 1, guide tube 3 is itself slidably mounted in a sleeve 71 for limited axial movement. An outer sleeve 7 is rigidly attached to inner sleeve 71. A spring is mounted between the outer sleeve 7 and an abutment on guide tube 3 and acts to bias guide tube 3 upwardly with respect to sleeves 7 and 71. Sleeves 7 and 71 are secured to housing or guard 8 by suitable means. A tongue portion 3' of the guide tube extends downwardly into a position in which its lower end can be brought into the plane of the lower face of the guard 8 whenever the stud driver housing 4 and barrel 6 are advanced toward a work surface W as shown in FIG. 2, which action prepares the tool for firing and releases certain internal safety features as more fully explained in the co-pending application of Walker, Reed and Catlin, above referred to.

Figure 4:
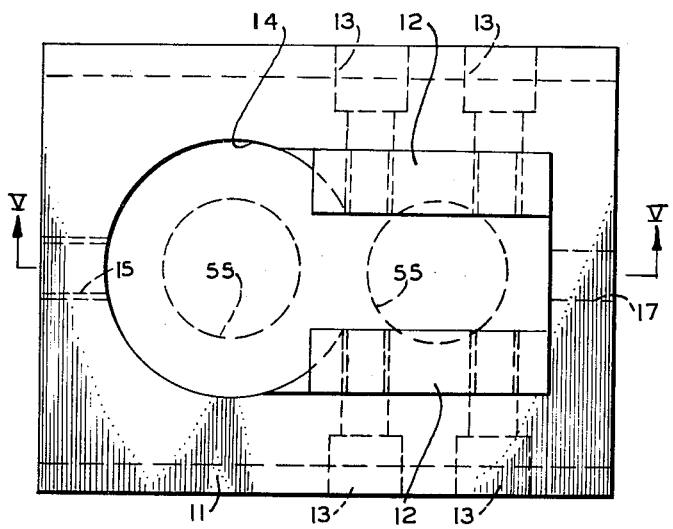
FIGURE 4 is a plan view of the main slidable assembly carrying the piston stop abutments.

The guard 8 is arranged to engage and enclose a portion of a work surface into which a fastener device is to be projected. Fixedly mounted in housing or guard member 8 are two guide members 9 secured in place by suitable means such as screws 45. Each guide member is provided with a guideway 10 best shown in FIGURE 3. Slidably mounted in guideways 10 is frame member 11. Referring to FIGURE 4 it can be seen that frame member 11 is provided with a passageway therethrough. The passageway receives the tongue 3' and consists of an enlarged portion 14 and a restricted portion. Mounted on opposed sides of the restricted portion are replaceable impact abutment blocks 12 held in place by screws 13. The slidable frame member 11 is mounted in the guideways 10 for movement between two extreme positions, one in which the abutment blocks 12 are in partial alignment with the bore 55 of the tool barrel 6 and the other in which the enlarged portion 14 of the frame passageway is in alignment with the bore 55 of the tool barrel 6.

Secured by threaded connection 15 to one end of frame 11 is a rod like element 16 which projects through an opening 91 in the sidewall of guard 8. At the other end of frame 11 is an aperture 17 which slidably receives a projecting spring guide member 18. Guide member 18 is attached rigidly to the side wall of guard member 8. A helical coil spring 19 is mounted on guide 18 and acts between the side wall of guard 8 and one end of frame member 11 to resiliently hold the frame in a position such that the abutment blocks 12 are in partial alignment with bore 55 of the barrel 6. When it is desired to move the abutment blocks out of blocking alignment with the barrel, pressure is exerted on rod 16 to move the frame against the spring pressure of spring 19.

Figure 6:
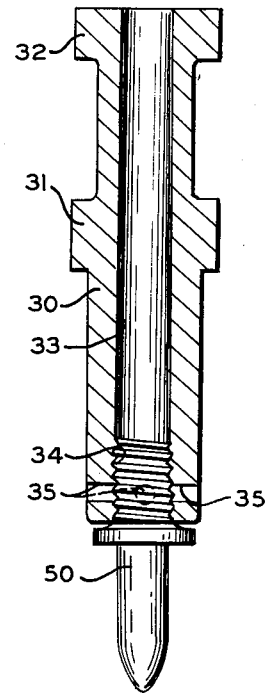
FIGURE 6 is a cross sectional view of the fastener pin-carrying piston showing a stud fastened thereto.
Figure 5:
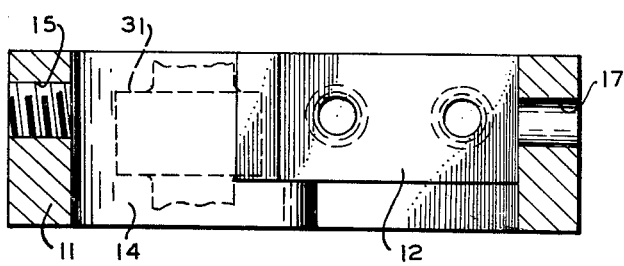
FIGURE 5 is a cross sectional view of the slidable assembly of FIGURE 4 taken on line V—V of FIGURE 4.
Figure 7:
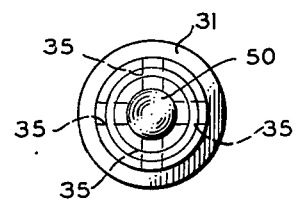
FIGURE 7 is an end view of the fastener pin and piston as shown in FIGURE 6.

The piston used with the tool is best shown in FIGURE 6 and consists of a hollow cylindrical body portion 30 which is provided with two radial annular flange portions 31 and 32 which slidably engage the bore of the barrel. The hollow interior of the piston is provided with internal threads at one end thereof for the purpose of securing the fastener devices, such as 50, thereto. Radial ports 35 are provided in the threaded portion of the piston for the purpose of venting the propellant gases to reduce the driving power of the piston in the event that a fastener device is inadvertently not screwed all the way into the piston interior.

The piston is shown in partial outline in FIGURE 3 to illustrate the cooperation of the abutment blocks 12 with the flange 31 on the piston to prevent free flight of the projected piston in the event that the fastener attached thereto does not encounter sufficient work piece resistance to itself stop the movement of the fastener and piston. In order to release the piston and fastener finger pressure is exerted on push rod 16 to move the frame 11 and the abutment blocks 12 out of engagement with the piston flanges 31 to permit withdrawal of the fastener and piston from the tool. As is clear from the drawings, the spring 19 maintains the abutment blocks in operative position at all times.

The piston and fastener as well as the propellant cartridge are loaded from the upper or breech end of the tool 2 in conventional manner.

A modified version of a safety attachment for an explosive operated tool embodying the present invention is illustrated in FIGURE 8. As in the version of the device illustrated in FIGURES 1 and 2, a slidable frame 11 is mounted in guideways 10 in guide members 9 which members are fixedly mounted in guard or housing 8'. A projecting rod element 16 is secured at one side of the frame 11 and projects through an aperture 91 in the side wall of guard 8. A helical coil spring 74 is mounted on the rod 16 and acts between the guard side wall and the frame 11 to force the frame 11 toward the right as viewed in FIGURE 8. The upper surface of guard 8 is provided with an aperture 72 and two upstanding lugs 78 adjacent thereto. Journalled in lugs 78 is a pivot pin 81 on which is mounted a frame actuating lever 70 for limited pivotal movement. The lower end of actuating lever 70 extends into the guard member 8 and engages one end of the slidable frame 11. The other end of lever 70 extends upwardly and is provided at its extremity with a curved cam pitch portion 79 which engages the tool housing element 4 in one extreme position of the relative movement between the tool 2 and the safety attachment 1. This relative position of the cam-engaging portion of the housing 4 is shown in dotted lines in FIGURE 8. As the tool 2 with its safety attachment 1 is placed in operative position with respect to a work surface and pressure is exerted on the tool for the operation thereof the tool 2 partakes of a relative movement or displacement with respect to the attachment 1. During this relative movement the housing 4 engages the cam portion 79 of lever 70 and forces it outwardly with respect to the tool axis. This causes the other end of lever 70 to move inwardly with respect to the tool axis and force the frame 11 into a position such that the abutment blocks 12 are in partial alignment with the bore 55 of the tool barrel 6 in operative position to prevent free flight of the fastener and piston upon firing. Accordingly when the downward pressure on the tool 2 is released and the tool with its attachment are lifted from the work surface the relative movement between tool 2 and attachment 1 is reversed allowing the spring 74 to force the frame and abutment blocks out of alignment with the barrel bore and permit withdrawal of the piston and fastener.

In normal operation of the tool and its attachment device, a fastener device is secured into the piston 30 by means of the interengaging threaded portions. The connected piston and fastener are inserted into the breech end of the barrel in the conventional manner. A cartridge is also loaded at the breech end of the tool in a conventional manner. The tool with its attachment are then placed in operative position with respect to the work piece and the tool actuated to fire the cartridge. Explosion of the cartridge drives the piston and fastener through the barrel of the tool with great force and into the work surface against which the device is positioned. If normal work surface resistance is encountered it will stop the fastener after a given penetration distance without the flanges on the piston engaging the abutment blocks 12 on slide 11. Then the push rod 16 of the tool shown in FIGURE 1 is actuated to move the frame 11 and abutment blocks into inoperative position and allow separation of the tool and attachment from the piston and fastener device which are now secured into the work surface. The piston is then unscrewed from the fastener device and the process can be repeated.

If unexpectedly light, or no resistance is encountered by the fastener, the flight of the fastener and piston is positively halted by the engagement of piston flanges 31 striking abutment blocks 12 thus eliminating the great danger of a freely flying fastener. In such a case the piston and fastener are released by actuation of the push rod 16. In the event impact damages the abutment blocks they may be easily replaced.

Operation of the modified device shown in FIGURE 8 is the same except that actuation of the slidable frame carrying the abutment blocks is accomplished merely by placing the tool and attachment in operative position against the work surface as is believed clear from the foregoing discussion.

It can be seen that especially in the modified version of the invention shown in FIGURE 8 that a highly simplified method of operation is made possible; one in which the safety feature of the combined tool and attachment is made operative merely by placing the tool and attachment into position against a work surface. Removal of the combined tool and attachment structure from operative position causes the safety abutments to be withdrawn allowing expeditious separation of the piston and fasteners from the device.

The safety structures disclosed may be used with conventional tools as attachments to achieve a degree of safe operation not heretofore obtainable.

While two forms of the invention herein are described, including a preferred embodiment, it is to be understood that the invention is not limited to these precise forms of apparatus and that changes may be made therein without departing from the scope of the invention which is defined in the appended claims.

I claim:

1. In combination with an explosive operated tool of the type which projects fastener devices individually at high velocities from a barrel member into a work surface and utilizes a piston member engaged to the rear end of said fastener devices for transmitting the driving forces of the propellant explosive to said fastener devices to accelerate said fastener devices and engaged piston through said barrel against a work surface; a safety device secured to said tool in operative position therewith for limiting movement of the projected piston and fastener to a predetermined distance and prevent free flight of said piston and fastener device, said safety device comprising a housing member, movable abutment means mounted in said housing member for movement between a first position in the path of movement of the projected piston to prevent departure of the piston from said tool and a second position spaced from the path of movement of the projected piston, resilient means urging said abutment means toward said first position and manually actuated means for moving said abutment means against the force of said resilient means to said second position to permit complete removal of said piston from said tool.

2. A safety attachment for an explosive operated tool of the type which projects fastener devices at high velocities from the muzzle end of a barrel member into a work surface and utilizes a piston member slidably engaged in the barrel and releasably secured to the rear end of said fastener device for transmitting the driving force of the propellant explosive to said fastener devices to accelerate said fastener device and piston through said barrel and against a work surface, said safety attachment comprising a housing, means for securing said housing to said tool in operative relation thereto, guideways in said housing extending perpendicularly to the axis of the barrel, movable abutment means mounted in said guideways adjacent the muzzle end of said barrel member for longitudinally slidable movement therein between a first position in partial axial alignment with said barrel and in the path of movement of the projected piston member to prevent complete departure of said piston member from said attachment, and a second position out of axial alignment with said barrel and spaced away from the path of movement of said piston member to permit complete withdrawal of said piston from said attachment, and means to move said abutment means in said guideway between said first and said second positions.

3. A safety attachment for an explosive operated tool of the type which projects fastener devices at high velocities from the muzzle end of a barrel member into a work surface and utilizes a piston member slidably engaged in the barrel and releasably secured to the rear end of said fastener device for transmitting the driving force of the propellant explosive to said fastener devices to accelerate said fastener device and piston through said barrel and against a work surface, said safety attachment comprising a housing, means for securing said housing to said tool in operative relation thereto, guideways in said housing extending perpendicularly to the axis of the barrel, movable abutment means mounted in said guideways adjacent the muzzle end of said barrel member for longitudinally slidable movement therein between a first position in partial axial alignment with said barrel and in the path of movement of the projected piston member to prevent complete departure of said piston member from said attachment, and a second position out of axial alignment with said barrel and spaced away from the path of movement of said piston member to permit complete withdrawal of said piston from said attachment, means actuated by the positioning of said attachment and tool in operative relationship against a work surface for actuating said abutment means from said second position to said first position and means urging said abutment means toward said second position.

4. A safety attachment for an explosive operated tool of the type which projects fastener devices at high velocities from the muzzle end of a barrel member into a work surface and utilizes a piston member slidably engaged in the barrel and releasably secured to the rear end of said fastener device for transmitting the driving force of the propellant explosive to said fastener devices to accelerate said fastener device and piston through said barrel and against a work surface, said safety attachment comprising a housing, means for securing said housing to said tool in operative relation thereto, guideways in said housing extending perpendicularly to the axis of the barrel, movable abutment means mounted in said guideways adjacent the muzzle end of said barrel member for longitudinally slidable movement therein between a first position in partial axial alignment with said barrel and in the path of movement of the projected piston member to prevent complete departure of said piston member from said attachment, and a second position out of axial alignment with said barrel and spaced away from the path of movement of said position member to permit compelte withdrawal of said piston from said attachment, means actuated by the positioning of said attachment and tool in operative relationship against a work surface for actuating said abutment means from said second position to said first position and means urging said abutment means toward said second position, said abutment means provided with replaceable impact absorbing elements.

5. An attachment for an explosive actuated tool of the type which utilizes explosion forces to propel a fastener device from a barrel member into a work surface by means of a piston element slidably received in said barrel member and positioned between said fastener device and the explosion gases, said piston having means for attachment to said fastener device, said attachment comprising a housing, connecting means for securing said housing to said tool in operative relation thereto, said connecting means constructed and arranged to permit limited relative movement between said tool and said housing, guideways in said housing extending perpendicularly to the axis of the barrel, movable abutment means mounted in said guideways adjacent the muzzle end of the tool barrel member for longitudinally slidable movement therein between a first position out of axial alignment with said barrel and spaced from the path of movement of said projected piston element and a second position in partial axial alignment with said barrel and in the path of movement of said projected piston element to prevent complete departure of said piston element from said attachment, means cooperating with said housing and said tool for actuating said abutment means between said two positions upon relative movement between said tool and said housing.

6. A safety attachment for an explosive operated tool of the type which projects fastener devices at high velocities from the muzzle end of a barrel member into a work surface and a piston member slidably engaged in the barrel and releasably secured to the rear end of said fastener device for transmitting the driving force of the propellant explosive to said fastener devices to accelerate said fastener device and piston through said barrel and against a work surface, said safety attachment comprising a housing, means for securing said housing to said tool in operative relation thereto, guideways in said housing extending perpendicularly to the axis of the barrel, movable abutment means mounted in said guideways adjacent the muzzle end of said barrel member for longitudinally slidable movement therein between a first position in partial axial alignment with said barrel and in the path of movement of the projected piston member to prevent complete departure of said piston member from said attachment, and a second position out of axial alignment with said barrel and spaced away from the path of movement of said piston member to permit complete withdrawal of said piston from said attachment, and means to move said abutment means in said guideway between said first and said second positions.

7. A safety attachment for an explosive operated tool of the type which projects fastener devices at high velocities from the muzzle end of a barrel member into a work surface and a piston member slidably engaged in the barrel and releasably secured to the rear end of said fastener device for transmitting the driving force of the propellant explosive to said fastener devices to accelerate said fastener device and piston through said barrel and against a work surface, said safety attachment comprising a housing, means for securing said housing to said tool in operative relation thereto, guideways in said housing extending perpendicularly to the axis of the barrel, movable abutment means mounted in said guideways adjacent the muzzle end of said barrel member for longitudinally slidable movement therein between a first position in partial axial alignment with said barrel and in the path of movement of the projected piston member to prevent complete departure of said piston member from said attachment, and a second position out of axial alignment with said barrel and spaced away from the path of movement of said piston member to permit complete withdrawal of said piston from said attachment, first means to move said abutment means in said guideway between said first and said second positions, and second means to move said abutment means in said guideway between said second and said first positions.

References Cited in the file of this patent

UNITED STATES PATENTS

| | | |
|---|---|---|
| 2,767,398 | Pfaff et al. | Oct. 23, 1956 |
| 2,925,602 | Kopf et al. | Feb. 23, 1960 |

FOREIGN PATENTS

| | | |
|---|---|---|
| 1,135,847 | France | Dec. 22, 1956 |